July 15, 1969     G. R. DIXON ET AL     3,455,202
LIQUID PROPELLANT-ACTUATED DEVICE

Filed Jan. 25, 1968     6 Sheets-Sheet 1

INVENTORS
GLENN R. DIXON
DAVID FINDLAY

BY *William W. Jones*

ATTORNEY

United States Patent Office 3,455,202
Patented July 15, 1969

3,455,202
LIQUID PROPELLANT-ACTUATED DEVICE
Glenn R. Dixon, Brevard, N.C., and David Findlay, Guilford, Conn., assignors to Olin Mathieson Chemical Corporation, a corporation of Virginia
Filed Jan. 25, 1968, Ser. No. 700,439
Int. Cl. F41c 7/00
U.S. Cl. 89—7                                                    3 Claims

ABSTRACT OF THE DISCLOSURE

A liquid propellant-actuated device having pump means to deliver a charge of liquid propellant to a combustion chamber and having piston means in the combustion chamber operable to adiabatically compress an air-liquid propellant admixture to obtain ignition of the latter. Trigger means operable to sequentially actuate first the pump and secondly the piston, and cocking means to cock both the pump and the piston prior to actuation by the trigger means.

---

This invention relates to a device which is actuated by the adiabatic compression of a liquid propellant confined in a combustion chamber.

It is known that an admixture of certain liquid propellants and air can be compressed to a very small volume with the heat generated by the compression of the air causing the propellant to ignite. The compression ignition of the propellant produces high pressure gases which can be directed against a projectile or a working piston to act as the propelling agent for the projectile or piston.

Devices which utilize a compressible air-liquid propellant admixture to provide a source of energy must include a compression-combustion chamber which is sufficiently pneumatically sealed to be capable of permitting enough compression to ignite the propellant, and must, furthermore, prevent mis-direction of the high pressure gases produced by ignition. The combustion chamber must communicate with one face of the projectile or piston so that the high pressure gases may act upon the projectile or piston to propel the latter. Such a device, desirably, should also include means for separately storing and delivering small charges of propellant to the combustion chamber, thereby permitting use of the device without requiring the operator to, before each shot, transfer a charge of propellant to the combustion chamber from a separate container of propellant carried by the operator. Moreover, it is highly desirable that such a device include triggering means whereby, both the charge of propellant is delivered to the combustion chamber, and the piston is induced to compress the charge by a single actuation. The inclusion of such a triggering feature prevents the possibility that a charge of propellant could be delivered to the combustion chamber, and the device then set aside thereby leaving the propellant charge in the combustion chamber. Thus the chance of one unknowingly picking up a "loaded" device is eliminated.

It is, therefore, an object of this invention to provide a liquid propellant-actuated device of the adiabatic compression type having means for storing a volume of propellant and delivering a charge thereof to a combustion chamber.

It is a further object of this invention to provide a device of the character described having means operable to provide a substantially air-tight seal for the combustion chamber while, at the same time, permitting communication between the combustion chamber and an object to be propelled by the device.

It is a still further object of this invention to provide a device of the character described wherein the object to be propelled itself provides a seal for one end of the combustion chamber.

It is yet another object of this invention to provide a device of the character described having means operable to move a piston to a firing position in the combustion chamber while also moving a pump actuator to a cocked position.

It is still another object of this invention to provide a device of the character described having trigger means which is operable on single actuation to initially permit the pump actuator to cause the pump to deliver a charge of propellant to the combustion chamber and subsequently permit the piston to compress an admixture of the propellant charge and air in the combustion chamber.

Other and further objects, and advantages, and features of this invention will be apparent to those skilled in the art from the following descriptions together with the appended drawings, in which:

Figure 1:
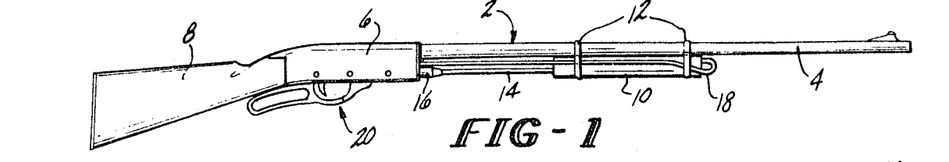
FIGURE 1 is a side view of a firearm embodiment of this invention.

Referring now to FIGURE 1, an embodiment of this invention in the form of a rifle 2 is shown. The rifle 2 includes a barrel 4, a receiver portion 6, and a stock 8. The forearm of the rifle 2 has been removed to more clearly show a pump 10 which contains a volume of liquid propellant and which is mounted on the barrel 4 by means of a pair of brackets 12. A reciprocally movable operating rod 14 is attached to the pump 10 on one hand and to a pump actuator 16 which protrudes from the receiver 6 and which is disclosed in detail hereinafter.

A tubular conduit 18 is connected to the forward end of the pump 10, the conduit 18 communicating with a combustion chamber 160 in the receiver 6 by means of a port 19 in the wall of the combustion chamber (see FIGURES 5 and 10) to provide means whereby a charge of liquid propellant can be transferred from the pump 10 to the combustion chamber.

Figure 2:
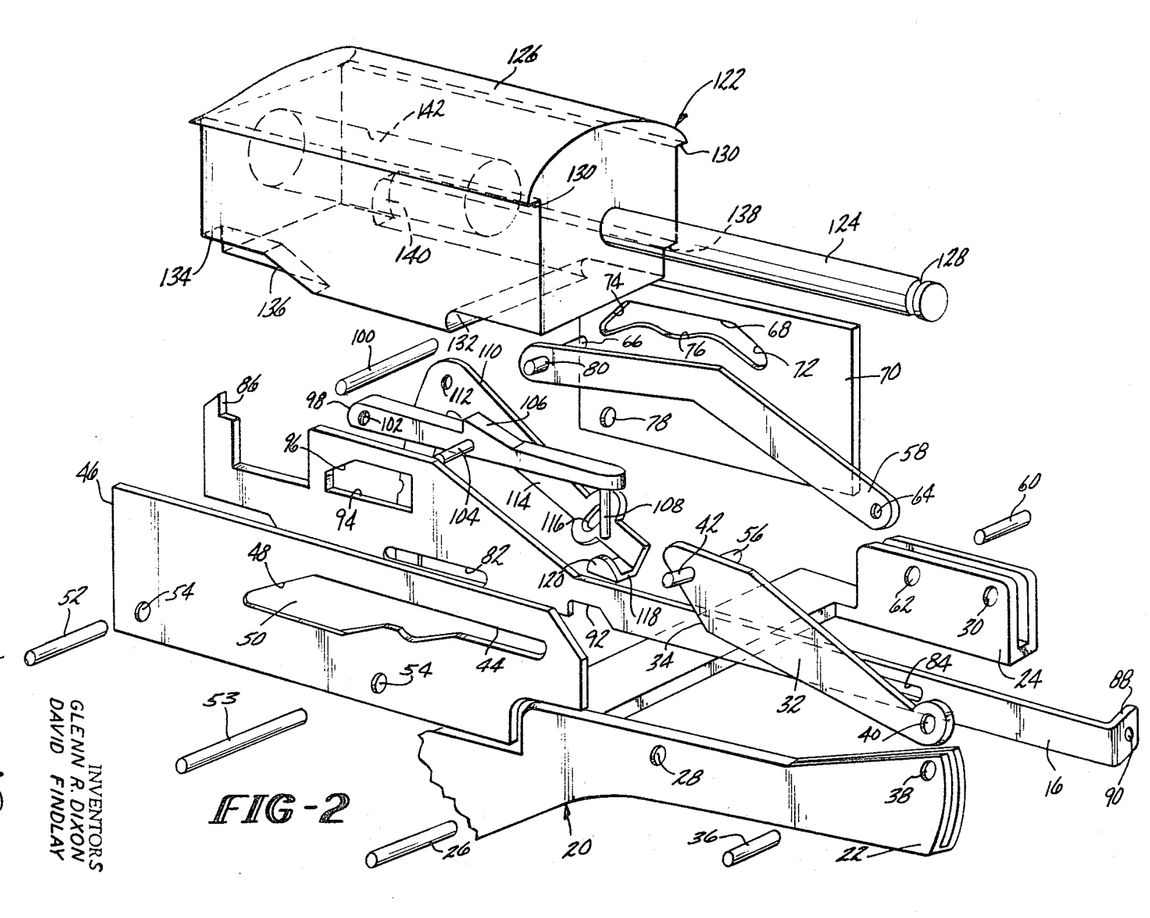
FIGURE 2 is an exploded view of components of the firearm shown in FIGURE 1 which are disposed within the receiver.

FIGURE 2 is an exploded view of the component parts of the preferred embodiment of the invention which are housed within the receiver 6. A cocking lever 20 having a bifurcated end portion defining a pair of forked, spaced-apart arms 22 and 24 is pivotally mounted on the receiver 6 by means of a pin 26 which passes through appropriate apertures in the receiver walls (not shown) and a pair of apertures 28 and 30 disposed in the arms 22 and 24 respectively. A first linking arm 32 having a camming surface 34 is pivotally connected to the cocking lever arm 22 by means of a pin 36 which passes through a pair of apertures 38 and 40 disposed in the lever arm 22 and the linking arm 32 respectively. It is noted that the aperture 38 is disposed forwardly of the pivot pin 26. The linking arm 32 includes a first laterally protracted pin 42 which extends into a slot 44 cut through a first camming plate 46. The slot 44 is provided with a downwardly sloping camming surface 48 and a downwardly enlarged portion 50. The camming plate 46 is mounted in the receiver 6 by means of a pair of pins 52 and 53 which pass through appropriate apertures in the receiver wall (not shown) and through a pair of spaced-apart apertures 54 disposed in the plate 46. The linking arm 32 further includes a second laterally protracted pin 56 the purpose of which will be set forth hereinafter.

A second linking arm 58 is pivotally connected to the other cocking lever arm 24 by means of a pin 60 which passes through a pair of apertures 62 and 64 disposed in the lever arm 24 and the linking arm 58 respectively. It is noted that the lever arm aperture 62 is disposed rearwardly of the pivot pin 26. The second linking arm 58 includes a first laterally protracted pin 66 which extends into a slot 68 cut through a second camming plate 70. The slot 68 includes two downwardly sloping camming surfaces 72 and 74 at opposite ends thereof and further includes a medial downwardly enlarged portion 76. The second camming plate 70 is mounted in the receiver by means of a pair of apertures 78 (only one of which is shown) which are coaxial with the apertures 54 and which receive the pins 52 and 53. It is noted that the camming plates 46 and 70 are disposed adjacent to opposite sides of the receiver 6. The second linking arm 58 also includes a second laterally protracted pin 80 the purpose of which is set forth hereinafter.

The pump actuator 16 is disposed inwardly adjacent to the cocking lever arm 22 for sliding movement within the receiver 6. The pump actuator 16 includes a pair of elongated slots 82 and 84 through which pass the pins 53 and 26 respectively. The pump actuator 16 further includes an upwardly extending shoulder 86 at one end thereof and a laterally bent terminal portion 88 having an aperture 90 at the other end thereof. A notch 92 is cut upwardly into the bottom edge of the pump actuator 16. The pump actuator further includes a window 94 having a downwardly sloping camming surface 96 therein.

A bolt sear 98 is disposed inwardly adjacent to the pump actuator 16 for pivotal movement about a pin 100 which passes through an aperture 102 in one end of the bolt sear 98. The bolt sear 98 includes a laterally directed lug 104 which extends through and beyond the window 94 in the pump actuator 16. An upwardly extending tooth 106 is disposed on the upper surface of the bolt sear 98, and a downwardly extending spring guide 108 is disposed on the lower surface of the sear.

A generally V-shaped trigger member 110, having an aperture 112 for pivotal connection to the pin 100, is disposed adjacent to the bolt sear 98. The trigger member includes a forwardly and downwardly extending leg 114 having a generally oval aperture 116. A laterally extending finger 118 having an upwardly bent terminal portion 120 is positioned at the lower end of the leg 114, the terminal 120 being substantially coplanar with the pump actuator 16.

A piston assembly, indicated generally by the numeral 122, is mounted in the receiver 6 for reciprocating movement therein. The piston assembly 122 includes a piston portion 124 and a head or bolt portion 126 connected thereto. The piston portion 124 may, for convenience in assembly, be screwed into the front face of the bolt portion 126. The piston portion 124 may include one or more gas grooves 128 adjacent the forward end thereof to increase the sealing properties of the piston. The bolt or head portion 126 includes a pair of laterally extended flanges 130 for sliding engagement with complementary shoulders 131 in the walls of the receiver (see FIGURES 5–10). A downwardly extending transverse shoulder 132 is formed on the bottom surface of the bolt 126. A first notch 134 having a downwardly and forwardly inclined camming surface 136 is cut into the lower edge on one side of the bolt 126, the first notch 134 extending through the rear face of the bolt 126. A second notch 138 having a closed rear face 140 is cut into the lower edge of the other side of the bolt 126, the second notch 138 extending through the front face of the bolt. The bolt 126 further includes a cylindrical bore 142 for the reception of a spring and spring guide (see FIGURES 5–10).

Figure 3:
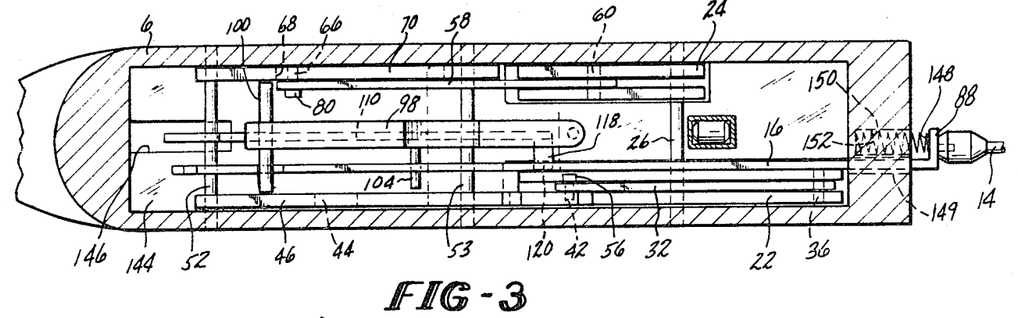
FIGURE 3 is a horizontal sectional view of the receiver portion of the firearm showing the relative position therein of the various components shown in FIGURE 2 with the bolt and combustion chamber being removed for purposes of clarity.

Referring now to FIG. 3, the various components referred to above are shown as mounted in the receiver 6 with the piston assembly 122 being removed for purposes of clarity. A bottom plate 144 closes the bottom of the receiver 6, the bottom plate having a slot 146 through which the trigger 110 extends. The pump actuator 16 extends through a slot 149 in the front face of the receiver 6 and the laterally bent terminal portion 88 of the pump actuator 16 is connected to the pump operating rod 14 by means of a screw 148. A spring member 152 is disposed in a well 150 in the front face of the receiver 6. The spring 152 is also connected to the terminal portion 88 of the pump actuator 16 by means of the screw 148 to bias the pump actuator 16 toward the pump 10.

Figure 4:
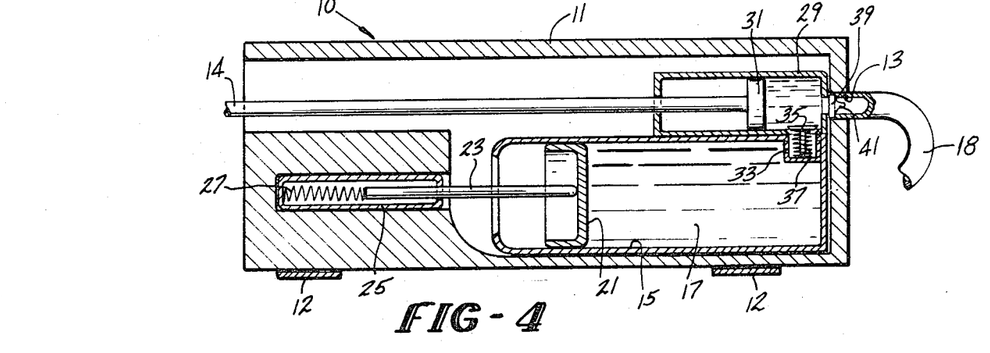
FIGURE 4 is a side sectional view of a pump.

FIGURE 4 discloses an embodiment of a pump, indicated generally by the numeral 10, which can be utilized with this invention. The pump includes a hollow housing member 11 having an aperture 13 in one end through which the conduit 18 passes. A container 15 for a volume of liquid propellant 17 is disposed in the housing 11, the container 15 having a movable end-wall member 21 therein. The volume of liquid propellant 17 is maintained at a substantially constant pressure by means of a rod 23 which bears against the end-wall member 21, the rod 23 being slidably housed in a guide 25 and biased to the right by a spring member 27. A cylinder 29 having a piston 31 slidably mounted therein is disposed adjacent to the propellant container 15. The pump operating rod 14 is rigidly affixed to the piston 31 to effect movement of the piston within the cylinder 29. Fluid communication between the container 15 and the cylinder 29 is established by means of a one-way check valve 33 having a head member 35 which is biased downwardly by a spring 37. The sides and bottom of the valve 33 are perforated to permit the propellant to flow therethrough. The conduit 18 communicates with the cylinder 29 through a one-way check valve 39 in the form of a resilient body of rubber or the like. The valve 39 includes a conical portion 41 having a plurality of fingers formed therein by means of a number of radially extending cuts in a known manner.

The pump 10 operates in the following manner. As is readily apparent from FIGURE 4, when the piston 31 is moved to the left, the pressure within the cylinder 29 falls. The valve 33 is such that when the pressure in the cylinder 29 falls below a predetermined valve, the valve head 35 is moved upwardly against the action of the spring 37 by the pressure in the container 15 to permit the propellant to flow from the container 15 into the cylinder 29. At the same time, the drop in pressure within the cylinder 29 causes the valve 39 to close by collapsing the resilient fingers against each other. When the piston 31 is driven to the right, the pressure within the cylinder 29 increases. The increase in pressure causes the valve 33 to close and the valve 39 to open. Thus the propellant is drawn from the container 15 into the cylinder 29 by moving the piston 31 to the left, and the propellant is then expelled from the cylinder 29 into conduit 18 by moving the piston 31 to the right. It is noted that when the pressure within the cylinder 29 increases above a predetermined value, the resilient fingers on the valve 39 are forced apart and the valve is thus opened.

FIGURES 5–10 disclose the operation of the cocking lever 20 to ready the piston assembly 122 of the firearm for firing. For purposes of clarity, the bolt sear 98, the pump actuator 16, and the trigger 110 have been removed from the receiver 6. As is shown in FIGURES 5–10, the barrel 4 has a threaded portion 154 which is screwed into a threaded aperture 156 in the front wall of the receiver 6. A part 158 of the barrel 4 extends beyond the threaded portion 154 and into the receiver 6 to define a combustion chamber 160. It is noted that the propellant conduit 18 communicates with the combustion chamber 16 through a port 19.

Figure 5:
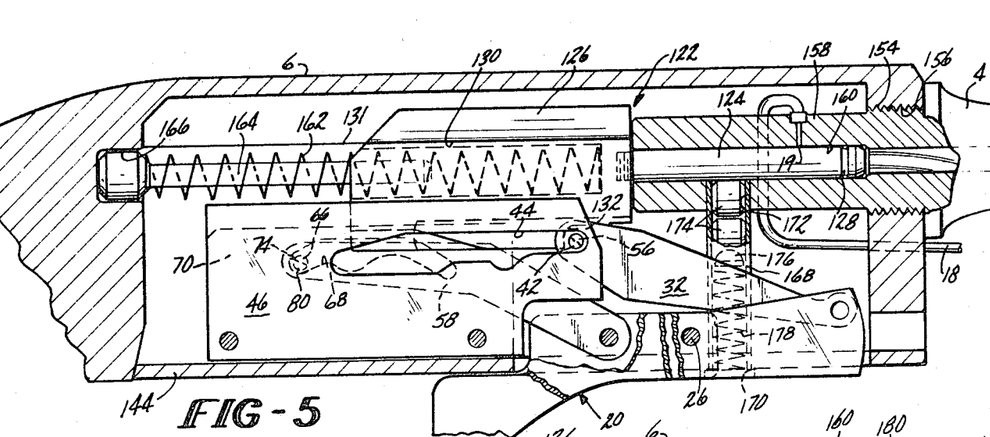
FIGURE 5 is a side sectional view of the receiver showing the piston in the fired position and wherein the trigger, bolt sear, and pump actuator have been omitted for purposes of clarity.

In FIGURE 5, the piston 124 is shown in the fired position with the bolt 126 being urged into its forwardmost position in the receiver 6 by means of a spring 162 disposed about a spring guide 164, which is mounted in a recess 166 in the rear wall of the receiver. Both the spring 162 and spring guide 164 extend into the cylindrical bore 142 in the bolt 126. The cocking lever 20 is shown in its normal position with the first pin 42 on the first linking arm 32 being disposed in the forwardmost portion of the slot 44 in the first camming plate 46. The second pin 56 on the first linking arm 32 is disposed forwardly adjacent to the transverse shoulder 132 on the bolt 126. The first pin 66 on the second linking arm 58 is disposed adjacent the camming surface 74 in the rearward portion of the slot 68 in the second camming plate 70.

A projectile magazine 168 is shown partially cut away, the projectile magazine 168 extending through an aperture 170 in the receiver bottom plate 144, and through an aperture 172 in the wall of the combustion chamber 160, with the magazine 168 being removably connected to the plate 144 in any known manner. A plurality of projectiles 174 are disposed in the magazine 168, the projectiles 174 being urged upwardly toward the combustion chamber 160 by a follower member 176 biased upwardly by a spring 178 disposed in the magazine 168. It is noted that the uppermost projectile in the magazine 168 is urged into contact with the side of the piston 124 when the latter is in the fired position.

Figure 6:
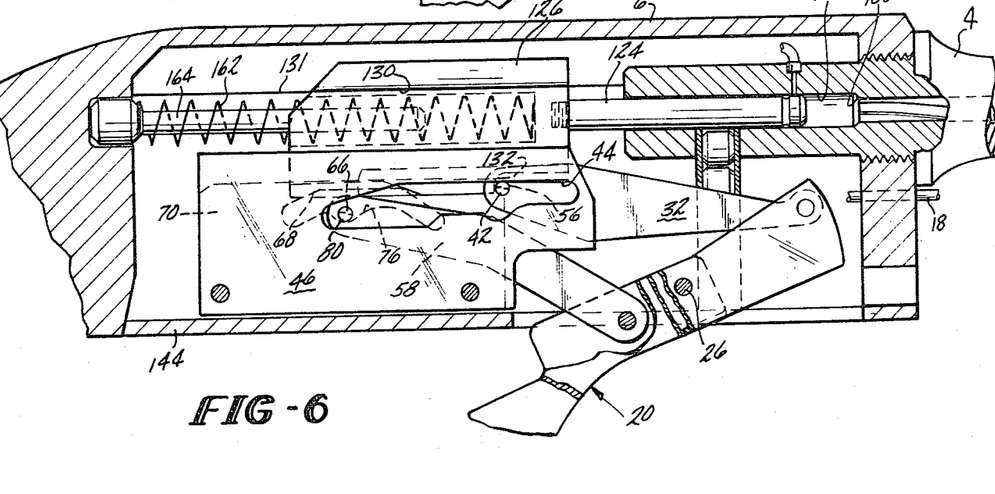
FIGURE 6 is a side sectional view similar to FIGURE 5 showing the initial phase of the cocking lever manipulation.

FIGURE 6 shows the initial stages of the first cocking movement of the cocking lever 20. The cocking lever 20 is pivoted in a counter-clockwise direction about the pin 26 thereby pushing the first linking arm 32 rearwardly and pulling the second linking arm 58 forwardly in the receiver 6. The first pin 42 on the linking arm 32 moves rearwardly in the slot 44 in the first camming plate 46 and the second pin 56 moves rearwardly into engagement with the transverse shoulder 132 on the bolt 126. Continued pivoting of the cocking lever 20 thus moves the bolt 126 rearwardly in the receiver 6 and the piston 124 rearwardly in the combustion chamber 160. Rearward movement of the bolt 126 in the receiver 6 thus compresses the spring 162. As the first pin 66 on the second linking arm 58 moves forwardly through the slot 68 in the second camming plate 70, the second pin 80 contacts the rearwardly moving bolt 126 and is downwardly displaced into the downwardly enlarged medial portion 76 of the slot 68, thereby permitting the bolt 126 to slide rearwardly past the pin 80.

Figures 7, 8:
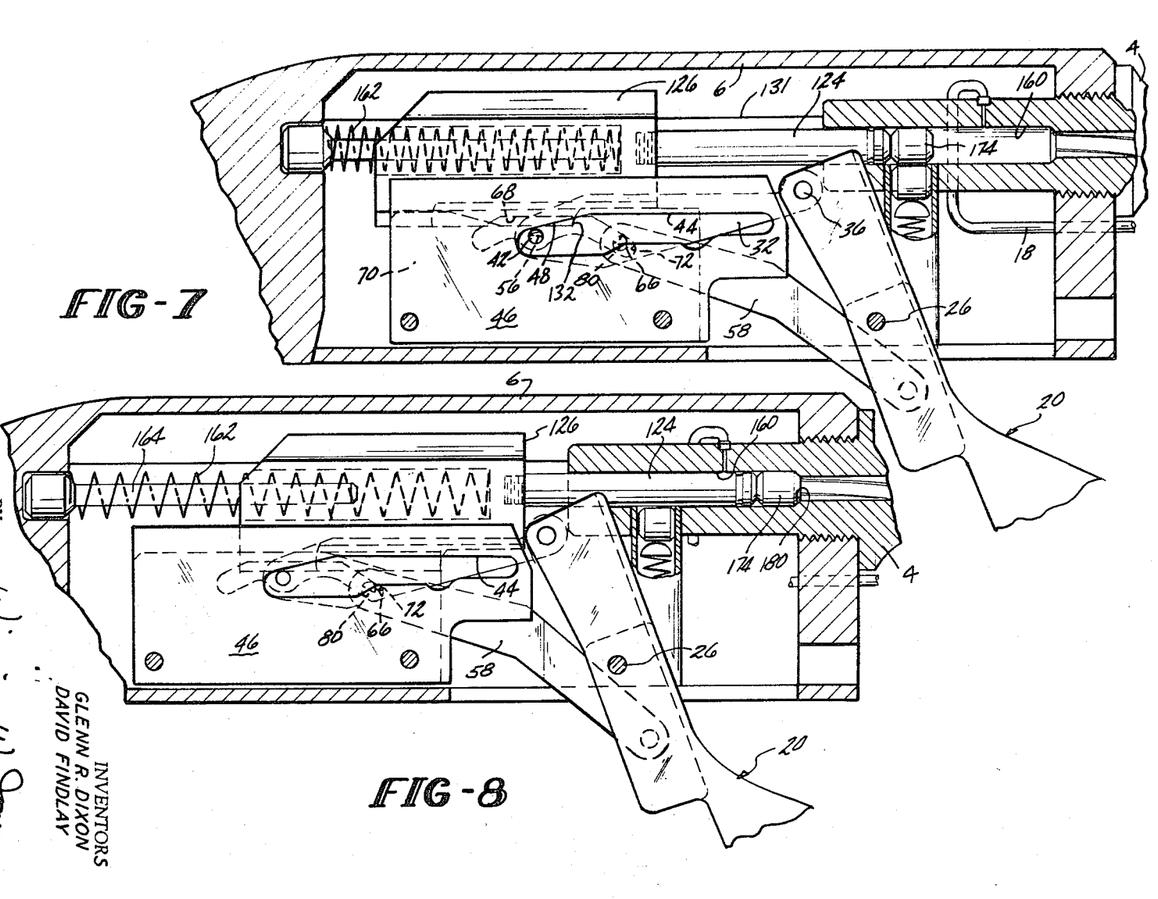
FIGURE 7 is a side sectional view similar to FIGURE 5 showing the piston in the loading position with a projectile having been fed into the combustion chamber and with the bolt having been disconnected from the cocking lever.
FIGURE 8 is a side sectional view similar to FIGURE 5 showing the piston in the projectile-seating position.

FIGURE 7 shows the piston 124 in the loading position wherein the piston 124 has been moved rearwardly in the combustion chamber 160 sufficiently to permit the uppermost projectile 174 to be moved up into the combustion chamber 160 in front of the piston 124. The cocking lever 20 has been pivoted to its extreme counter-clockwise position causing the first pin 42 on the first linking arm 32 to engage the camming surface 48 at the rear of the slot 44. The engagement between the pin 42 and the camming surface 48 causes the linking arm 32 to pivot downwardly about the pin 36 thereby disengaging the second pin 56 from the transverse shoulder 132 on the bolt 126. The bolt 126 is thus free to be driven forwardly in the receiver 6 by the spring 162. As shown in FIGURE 7, the bolt 126 has just begun its forward movement in the receiver 6. It is noted that the first pin 66 on the second linking arm 58 has engaged the camming surface 72 on the front portion of the slot 68 thereby moving the second pin 80 downwardly out of the path of the forwardly moving bolt 126.

FIGURE 8 shows the piston 124 in the projectile-seating position. The bolt 126 has been driven forward by the spring 162 thereby moving the piston 124 and projectile forward in the combustion chamber 160. The piston 124 drives the projectile 174 against an inwardly extending frusto-conical shoulder 180 at the forward end of the combustion chamber 160, the projectile 174 thereby effecting a substantially air-tight seal with the shoulder 180, to sealing the front end of the combustion chamber 160.

Figures 9, 10:
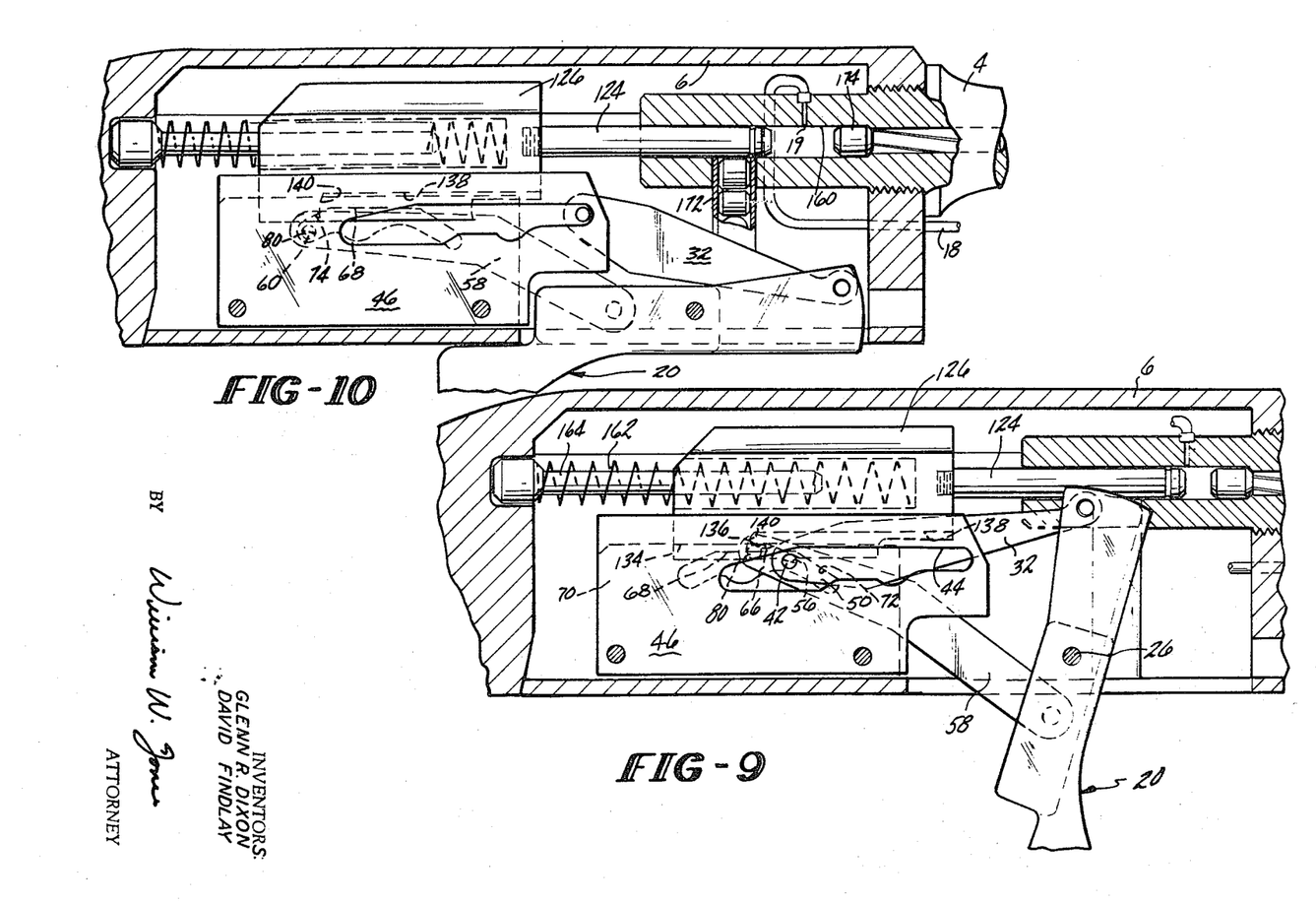
FIGURE 9 is a side sectional view similar to FIGURE 5 showing the initial phase of returning the cocking lever to its original position and wherein the bolt is again connected to the cocking lever.
FIGURE 10 is a side sectional view similar to FIGURE 5 showing the piston in the firing position.

FIGURE 9 shows the initial phase of the second cocking movement wherein the cocking lever 20 is returned to its normal position. The cocking lever 20 is pivoted in a clockwise direction about the pin 26 thereby pushing second linking arm 58 rearwardly and pulling the first linking arm 32 forwardly in the receiver 6. As the second linking arm 58 moves rearwardly in the receiver 6, the first pin 66 thereon moves rearwardly and upwardly in the camming portion 72 of the slot 68. The second pin 80 on the second linking arm 58 is thus moved rearwardly and upwardly into engagement with the rear face 140 of the second notch 138 on the bolt 126. Continued rearward movement of the pin 80 causes the bolt 126 to move rearwardly thus compressing the spring 162. Forward movement of the first linking arm 32 causes the first pin 42 thereon to move forwardly through the slot 44 in the first camming plate 46, and also causes forward movement of the second pin 56 thereon. As the second pin 56 moves forward through the receiver and the bolt 126 moves rearward through the receiver, the second pin 56 is brought into contact with the camming surface 136 on the bolt notch 134. The first linking arm 32 is thus deflected downwardly by the camming surface 136 with the first pin 42 moving into the downwardly enlarged portion 50 of the slot 44. The bolt 126 and the first linking arm 32 thus clear each other as they move in opposite directions in the receiver 6.

FIGURE 10 shows the piston 124 in the firing position with the cocking lever 20 having been returned to its normal position. The linking arms 32 and 58 have been returned to their original positions as shown in FIGURE 5. It is noted that the second pin 80 on the second linking arm 58 has been moved downwardly out of engagement with the rear face 140 of the bolt notch 138 by a downward camming movement of the first pin 60 as it engages the rearward camming portion 74 of the slot 68. The front end of the piston 124 is disposed forwardly of the magazine aperture 172 and provides a substantially air-tight seal at the rear of the combustion chamber 160. It is noted that, in the firing position, the propellant port 19 is between the seated projectile 174 and the front face of the piston 124. The bolt 126 is releasably latched in the position shown in FIGURE 10 by the bolt sear 98 as hereinafter described.

Figures 11, 12:
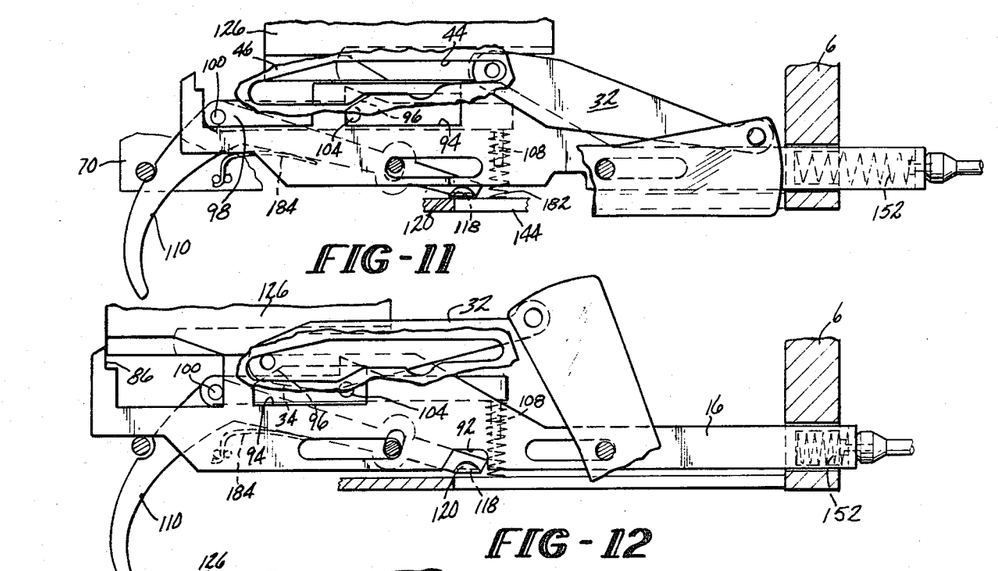
FIGURE 11 is a side sectional view of the receiver showing the bolt in the same position as in FIGURE 5 with the first camming plate being partially cut away and only the first linking lever, the pump actuator, the bolt sear, and the trigger being shown for purposes of clarity.
FIGURE 12 is a side sectional view similar to FIGURE 11 showing the bolt in the same position as in FIGURE 7.
Figure 13:
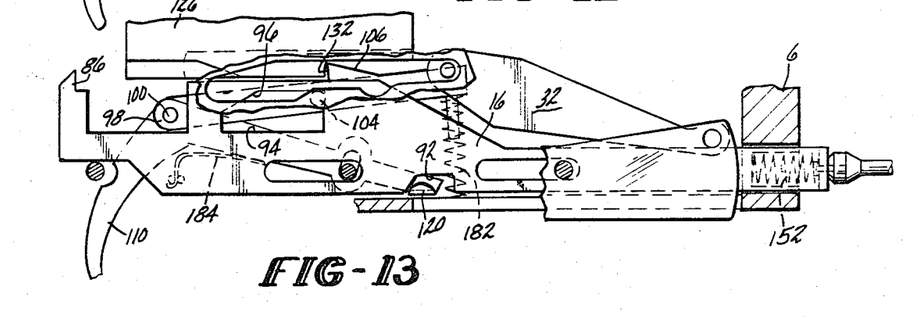
FIGURE 13 is a side sectional view similar to FIGURE 11 showing the bolt in the same position as in FIGURE 10 with the bolt sear engaging the bolt.

FIGURES 11-13 show the operation of cocking the pump actuator 16 and the interrelation between the bolt 126, the bolt sear 98, the trigger 110, the pump actuator 16 and the first linking arm 32. In FIGURES 11-13, portions of the receiver 6, the bolt 126, the cocking lever 20, and the first camming plate 46 have been cut away for purposes of clarity. In addition, the second camming plate 70, the second linking arm 58, the piston 124, and the combustion chamber 160 have been omitted for clarity.

In FIGURE 11 the bolt 126 is in the same position as shown in FIGURE 5. The pump actuator 16 is in a driven position and is biased thereto by the spring 152. The laterally directed lug 104 on the bolt sear 98 is in engagement with the camming surface 96 on the pump actuator window 94 thus causing the bolt sear 98 to pivot about the pin 100, against the bias of a spring 182 and out of engagement with the bolt 126. The upwardly bent terminal portion 120 on the laterally extending trigger finger 118 engages the lower surface of the pump actuator 16 thus pivoting the trigger 110 about the pin 100 against the bias of a blade spring 184.

FIGURE 12 shows the bolt 126 in the same position as in FIGURE 7. As the bolt 126 is moved from the position in FIGURE 11 to the position in FIGURE 12, the rear face of the bolt 126 engages the upwardly extending shoulder 86 on the pump actuator 16 and the latter is cocked by moving rearwardly, compressing the spring 152. The pump actuator 16 is moved sufficiently to the rear to permit the terminal 120 on the trigger finger 118 to pivot upwardly into the notch 92 in the pump actuator 16 under the influence of the spring 184. Rearward movement of the pump actuator 16 moves the camming surface 96 on the pump actuator window 94 out of engagement with the bolt sear lug 104, but the latter is then engaged by the camming surface 34 on the linking arm 32 to continue to hold the bolt sear 98 out of engagement with the bolt 126.

FIGURE 13 shows the bolt in the same position as in FIGURE 10 with the first linking arm 32 having been returned to its normal position. The pump actuator 16 is retained in a cocked position by engagement between the trigger finger terminal 120 and the wall of the pump actuator notch 92. The pump actuator window camming surface 96 is thus rearwardly spaced apart from the bolt sear lug 104. Since the first linking arm 32 has returned to its normal position, the bolt sear 98 is free to pivot under the influence of the spring 182 in a counterclockwise direction about the pin 100 thereby bring the bolt sear tooth 106 into engagement with the transverse bolt shoulder 132, thus searing the bolt 126 in the firing position.

The firearm is fired by manually pulling the trigger 110 in a clockwise direction. The trigger finger terminal 120 is thus moved downwardly out of engagement with the pump actuator notch 92 and the pump actuator 16 moves to the right under the influence of the spring 152. The pump 10 is thus caused to deliver a charge of liquid propellant to the combustion chamber 160. At the end of the forward stroke of the pump actuator 16, the pump actuator window camming surface 96 engages the bolt sear lug 104 causing the sear 98 to pivot downwardly disengaging the tooth 106 from the bolt shoulder 132. The bolt 126 is then free to travel forward under the influence of the spring 162, thereby driving the piston 124 forward through the combustion chamber 160 to compress the admixture of air and propellant and ignite the latter.

A propellant which may be used with this invention is a mixture of 60% ethyl nitrate and 40% n-propyl nitrate. The ignition pressure of this propellant at ambient temperature is above 500 p.s.i., therefore, the seated projectile and the piston must provide a sufficiently air-tight seal to reach such a pressure when the piston is driven forward. After ignition, the pressures in the combustion chamber are exceedingly high, the exact pressures depending on the charge and particular propellant. The result of this sharp increase in pressure is that the projectile is expelled from the combustion chamber through the barrel.

It is thus readily apparent that this invention advantageously provides a device which includes a pump for storing and delivering a charge of liquid propellant to a combustion chamber wherein an admixture of air and propellant is ignited by adiabatic compression. Moreover, this invention provides a single triggering means for serially actuating the pump and compression means in an irreversible sequence so that once the trigger is pulled to actuate the pump, the compression of the air-liquid propellant admixture automatically follows.

Since many changes and variations of the disclosed embodiment of this invention may be made without departing from the inventive concept, it is not intended to limit the invention otherwise than as required by the appended claims.

What is claimed is:

1. In a liquid propellant-actuated device having a combustion chamber, pump means operable to deliver a charge of liquid propellant to the combustion chamber, and spring loaded piston means movably mounted in the combustion chamber to compress and ignite an admixture of air and propellant, the improvement comprising:
 (a) a cocking lever connected to said device for pivotal movement from a first position to a second position and return;
 (b) first linking means movably connected to said cocking lever for releasable engagement with said piston means and operative to move said piston means from a fired position to a loading position when said cocking lever is moved from said first position to said second position;
 (c) second linking means movably connected to said cocking lever for releasable engagement with said piston means and operative to move said piston means from a projectile-seating position to a firing position when said cocking lever is moved from said second position to said first position; and
 (d) means connected to said device operative to disengage said first linking means from said piston means when the latter is in said loading position, and operative to disengage said second linking means from said piston when the latter is in said firing position.

2. In a liquid propellant-actuated device having a combustion chamber, pump means operable to deliver a charge of liquid propellant to the combustion chamber, and spring loaded piston means movably mounted in the combustion chamber to compress and ignite an admixture of air and propellant:
 (a) a cocking lever connected to said device for pivotal movement between a first position and a second position;
 (b) linking means connected to said cocking lever for releasable engagement with said piston means, said linking means being operative to initially move said piston means from a fired position to a loading position when said cocking lever is moved from said first position to said second position, and said linking means being operative to subsequently move said piston means from a projectile seating position to a firing position when said cocking lever is returned from said second position to said first position.
 (c) means operative to disengage a first portion of said linking means from said piston means when the latter is in said loading position, and to disengage the remainder of said linking means from said piston means when the latter is in said firing position;
 (d) sear means for releasably retaining said piston means in said firing position;
 (e) a pump actuator connected to said pump means, said pump actuator being movable between a cocked position and a driven position to operate said pump means, said pump actuator including a portion for engagement with said piston means whereby movement of said piston means to said loading position results in movement of said pump actuator to said cocked position;

(f) biasing means connected to said pump actuator to urge the latter toward said driven position;

(g) trigger means for releasably retaining said pump actuator in said cocked position against the action of said biasing means; and (h) camming means for engagement with said sear means when said pump actuator is in said driven position, said camming means being operative to disconnect said sear means from said piston means thereby causing the latter to be driven to said fired position after operation of said pump means.

3. The device as defined in claim 1 or 2, further comprising magazine means communicating with said combustion chamber for automatically feeding ones of a plurality of projectiles into said combustion chamber when said piston means is in said loading position.

References Cited
UNITED STATES PATENTS

| | | | |
|---|---|---|---|
| 1,174,840 | 3/1916 | Fisher | 89—7 |
| 1,383,111 | 6/1921 | Hall et al. | 89—7 |
| 2,947,221 | 8/1960 | Griffin et al. | 89—7 |

SAMUEL W. ENGLE, Primary Examiner

U.S. Cl. X.R.

89—33